United States Patent
Hinami

(10) Patent No.: US 11,697,313 B2
(45) Date of Patent: Jul. 11, 2023

(54) TYRE FOR RUNNING ON ROUGH TERRAIN

(71) Applicant: Sumitomo Rubber Industries, Ltd., Kobe (JP)

(72) Inventor: Yukiko Hinami, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 598 days.

(21) Appl. No.: 16/514,441

(22) Filed: Jul. 17, 2019

(65) Prior Publication Data

US 2020/0039299 A1 Feb. 6, 2020

(30) Foreign Application Priority Data

Aug. 1, 2018 (JP) ................. 2018-145262

(51) Int. Cl.
  *B60C 11/13* (2006.01)
  *B60C 11/11* (2006.01)
  *B60C 11/03* (2006.01)

(52) U.S. Cl.
  CPC ........... *B60C 11/1376* (2013.01); *B60C 11/11* (2013.01); *B60C 11/1369* (2013.01); *B60C 11/03* (2013.01); *B60C 2200/10* (2013.01); *B60C 2200/14* (2013.01)

(58) Field of Classification Search
  CPC .......... B60C 2200/06; B60C 2200/065; B60C 2200/08; B60C 2200/10; B60C 2200/12; B60C 2200/14; B60C 11/00; B60C 11/03; B60C 11/0306; B60C 11/0311; B60C 11/0316; B60C 11/1376; B60C 2011/0337
  USPC ......................................... 152/209.1, 209.11
  See application file for complete search history.

(56) References Cited

U.S. PATENT DOCUMENTS

| 4,649,976 | A | 5/1987 | Cherveny et al. |
| 5,464,050 | A | 11/1995 | Bonko |
| 6,651,711 | B2 | 11/2003 | Matsumura |
| 2011/0024009 | A1* | 2/2011 | Nakamura ............. B60C 11/13 152/209.1 |
| 2012/0018067 | A1* | 1/2012 | Hikita ..................... B60C 11/11 152/209.8 |

(Continued)

FOREIGN PATENT DOCUMENTS

| EP | 2412546 A1 | 2/2012 |
| EP | 3323640 A1 | 5/2018 |

(Continued)

OTHER PUBLICATIONS

Eguchi S, JP-2016150627-A, machine translation (Year: 2016).*
Extended European Search Report for European Application No. 19186454.5, dated Dec. 4, 2019.

*Primary Examiner* — Robert C Dye
*Assistant Examiner* — Sedef E Paquette
(74) *Attorney, Agent, or Firm* — Birch, Stewart, Kolasch & Birch, LLP

(57) ABSTRACT

A tyre for running on rough terrain has a tread portion including a plurality of blocks and tread crossing grooves extending between a first tread edge and a second tread edge without intersecting the blocks. Each of the tread crossing grooves includes a soil discharging space having a width of at least 10 mm or more and extending linearly so as to connect between the first tread edge and the second tread edge. The soil discharging space is inclined at an angle of 30 degrees or more and 50 degrees or less with respect to a tyre axial direction.

17 Claims, 6 Drawing Sheets

(56) References Cited

U.S. PATENT DOCUMENTS

| | | | |
|---|---|---|---|
| 2012/0024440 A1* | 2/2012 | Ishida | B60C 11/11 152/209.1 |
| 2013/0284333 A1 | 10/2013 | Ishida | |
| 2016/0016437 A1* | 1/2016 | Ito | B60C 11/11 152/209.15 |

FOREIGN PATENT DOCUMENTS

| | | |
|---|---|---|
| FR | 2.201.193 A2 | 4/1974 |
| JP | 2007-131111 A | 5/2007 |
| JP | 2013-230755 A | 11/2013 |
| JP | 2016150627 A * | 8/2016 |

* cited by examiner

TYRE FOR RUNNING ON ROUGH TERRAIN

TECHNICAL FIELD

The present invention relates to a tyre for running on rough terrain.

BACKGROUND ART

Japanese Patent Publication No. 5616924 has disclosed a pneumatic tyre for running on rough terrain which has a tread portion provided with a plurality of blocks. In the pneumatic tyre configured as such, the blocks stick into a soft road such as a sandy road and a muddy road to obtain traction and cornering force by edges of the blocks, therefore, steering stability is improved.

SUMMARY OF THE INVENTION

In recent years, there has been a demand for further improvement of steering stability performance on a soft road.

The present invention was made in view of the above, and a primary object thereof is to provide a tyre for running on rough terrain capable of improving the steering stability performance on a soft road.

In one aspect of the present invention, a tyre for running on rough terrain has a tread portion including a plurality of blocks and tread crossing grooves extending between a first tread edge and a second tread edge without intersecting the plurality of the blocks, in a development view of the tread portion, each of the tread crossing grooves includes a soil discharging space having a width of at least 10 mm or more and extending linearly so as to connect between the first tread edge and the second tread edge, and the soil discharging space is inclined at an angle of 30 degrees or more and 50 degrees or less with respect to a tyre axial direction.

In another aspect of the invention, it is preferred that the tread crossing grooves include first grooves each inclined to one side with respect to the tyre axial direction, and second grooves each inclined in an opposite direction to the first grooves.

In another aspect of the invention, it is preferred that the first grooves and the second grooves are arranged alternately in a tyre circumferential direction.

In another aspect of the invention, it is preferred that the tread portion includes a shoulder region and a middle region, the shoulder region extends inwardly in the tyre axial direction from the first tread edge and has a development width of one sixth of a tread development width, the middle region is arranged on an inner side in the tyre axial direction of the shoulder region and has a development width of one sixth of the tread development width, the plurality of the blocks includes a plurality of shoulder blocks arranged in the shoulder region and a plurality of middle blocks arranged in the middle region and connected with the shoulder blocks by shoulder tie bars, the shoulder tie bars include first shoulder tie bars, and two first shoulder tie bars extend from one shoulder block to be connected with different middle blocks.

In another aspect of the invention, it is preferred that the shoulder tie bars include second shoulder tie bars, and two second shoulder tie bars extend from one middle block to be connected with different shoulder blocks.

In another aspect of the invention, it is preferred that the first shoulder tie bars and the second shoulder tie bars are arranged alternately in a tyre circumferential direction.

In another aspect of the invention, it is preferred that an angle formed by the shoulder tie bars is less than 90 degrees.

In another aspect of the invention, it is preferred that each of the shoulder blocks and the middle blocks is virtually divided into four block portions by a line segment extending in the tyre axial direction which divides the block into two equal parts and a line segment extending in a tyre circumferential direction which divides the block into two equal parts, and each of the shoulder tie bars is connected with the block portions such that a distance between the shoulder block and the middle block which the shoulder tie bar connects becomes minimum.

In another aspect of the invention, it is preferred that at least one of the middle blocks and the shoulder blocks includes a stepped ground contacting surface including a first top surface and a second top surface having a smaller block height than the first top surface.

In another aspect of the invention, it is preferred that the tread portion includes a crown region arranged on an inner side in the tyre axial direction of the middle region and having a development width of one third of the tread development width, the plurality of the blocks includes a plurality of crown blocks arranged in the crown region, and in the crown region and the middle region, at least one of the crown blocks or at least one of the middle blocks is arranged on a tyre circumferential direction line over the entire length in the tyre axial direction.

In another aspect of the invention, it is preferred that the tread portion includes another middle region arranged on a side of the second tread edge of the crown region and having a development width of one sixth of the tread development width, the crown blocks include first crown blocks, second crown blocks, and third crown blocks, the first crown blocks are arranged within the crown region, each of the second crown blocks is arranged across the crown region and the middle region on a side of the first tread edge, each of the third crown blocks is arranged across the crown region and the middle region on a side of the second tread edge, one first crown block, one second crown block, and one third crown block form a crown block group, and the crown block groups are arranged in a tyre circumferential direction.

DESCRIPTION OF THE PREFERRED EMBODIMENT

An embodiment of the present invention will now be described in conjunction with accompanying drawings.

Figure 1:
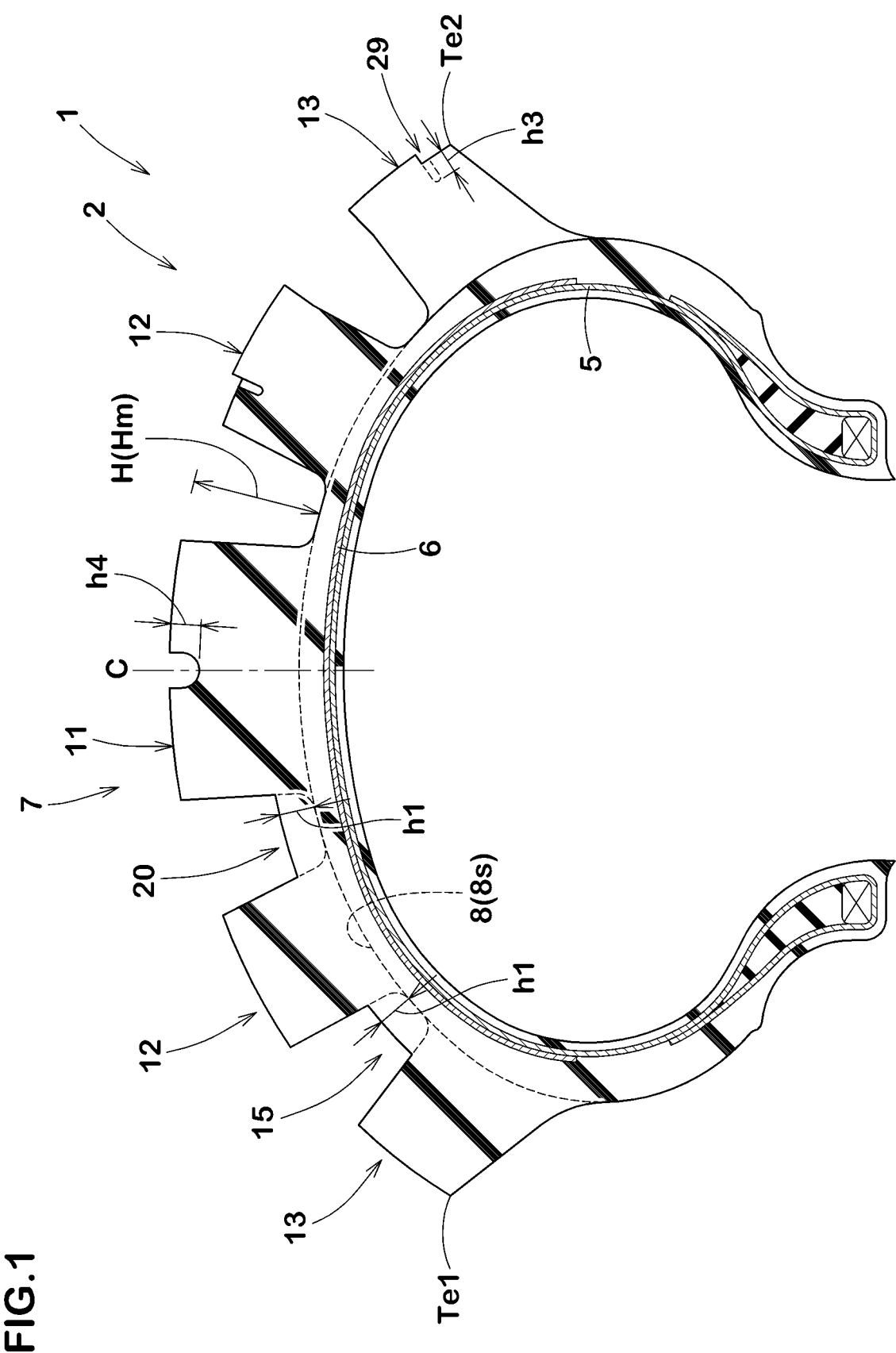
FIG. 1 is a lateral cross-sectional view of a tyre for running on rough terrain according to one embodiment of the present invention.
Figure 2:
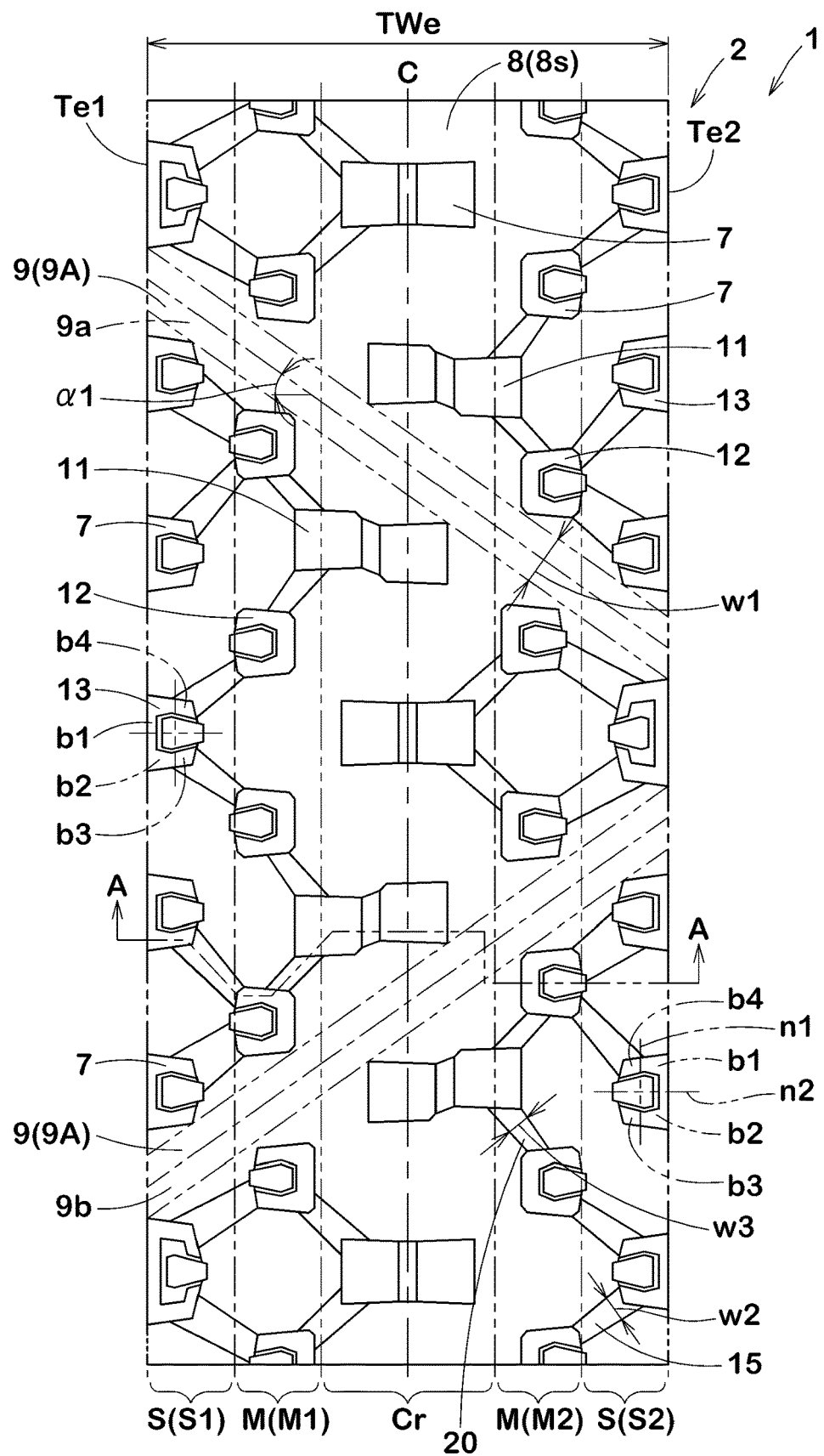
FIG. 2 is a development view showing a tread pattern of a tread portion of FIG. 1.

FIG. 1 is a lateral cross-sectional view of a tyre for running on rough terrain (hereinafter may be simply referred to as "tyre") 1 according to an embodiment of the present invention in a standard state. In this embodiment, a tyre for a motorcycle is shown as a preferred example of the tyre 1. The present invention is not limited to a tyre 1 for a motorcycle, but it is possible that the present invention is also applied to a tyre for a passenger car, a tyre for heavy load, and a tyre in other categories, for example. FIG. 2 is a development view showing a tread pattern of a tread portion 2 of the tyre 1. FIG. 1 is the cross-sectional view taken along A-A line of FIG. 2.

The "standard state" is a state in which the tyre 1 is mounted on a standard rim, inflated to a standard inner pressure, and loaded with no tyre load. In this specification, dimensions and the like of various parts of the tyre 1 are those measured under the standard state, unless otherwise noted.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, an outer surface of the tread portion 2 of the tyre 1 in this embodiment, in a lateral cross sectional view thereof, is curved in an arc shape convex outwardly in a tyre radial direction.

A carcass 5 and a belt layer 6 and the like are provided inside the tyre 1 in this embodiment. Known configurations are appropriately used for these.

As shown in FIG. 2, the tread portion 2 is divided so as to include a crown region (Cr), a pair of middle regions (M), and a pair of shoulder regions (S). The crown region (Cr) has a center thereof on a tyre equator (C) and has a development width of one third of a tread development width (Twe). The middle regions (M) are arranged on both outer sides of the crown region (Cr) and each of them has a development width of one sixth of the tread development width (Twe). Each of the shoulder regions (S) is arranged on an outer side of a respective one of the middle regions (M) and has a development width of one sixth of the tread development width (Twe).

The tread development width (Twe) is a distance in a tyre axial direction between a first tread edge (Te1) and a second tread edge (Te2) when the tread portion 2 is developed into a plane. The first tread edge (Te1) and the second tread edge (Te2) mean outermost ground contacting positions in the tyre axial direction of the tread portion 2. In FIG. 2, the first tread edge (Te1) is positioned on the left side and the second tread edge (Te2) is positioned on the right side, but the arrangement of these may be reversed.

Further, in this specification, one of the middle regions (M) on a side of the first tread edge (Te1) may be referred to as a first middle region (M1), and one of the middle regions (M) on a side of the second tread edge (Te2) may be referred to as a second middle region (M2). Furthermore, one of the shoulder regions (S) on a side of the first tread edge (Te1) may be referred to as a first shoulder region (S1), and one of the shoulder regions (5) on a side of the second tread edge (Te2) may be referred to as a second shoulder region (S2).

The tread portion 2 in this embodiment includes a plurality of blocks 7 and a tread groove 8 which separates the blocks 7 from each other. Each of the blocks 7 is raised from a groove bottom (8s) of the tread groove 8. The groove bottom (8s) of the tread groove 8 in this embodiment is formed by a smooth surface extending along the carcass 5. It is preferred that each of the blocks 7 has a block height (H) (shown in FIG. 1) from the groove bottom (8s) in about a range of from 6 to 19 mm.

The tread groove 8 in this embodiment includes tread crossing grooves 9 each extending between the first tread edge (Te1) and the second tread edge (Te2). Each of the tread crossing grooves 9 in this embodiment includes a soil discharging space (9A) extending linearly between the first tread edge (Te1) and the second tread edge (Te2). Each of the soil discharging spaces (9A) is formed so as to have a width (w1) of at least 10 mm or more. It is possible that each of the tread crossing grooves 9 configured as such forms a large mass of soil and soil in the soil discharging space (9A). Thereby, shearing force with respect to a soft road is increased, therefore, the steering stability performance on a soft road is improved.

Each of the soil discharging spaces (9A) is inclined at an angle ($\alpha 1$) in a range of from 30 to 50 degrees with respect to the tyre axial direction. As described above, the soil discharging spaces (9A) having the angle ($\alpha 1$) of 30 degrees or more have a tyre circumferential component, therefore, sand and soil in the soil discharging spaces (9A) are smoothly discharged from a side of the first tread edge (Te1) or a side of the second tread edge (Te2) by using a roll of the tyre. Further, the soil discharging spaces (9A) having the angle ($\alpha 1$) of 50 degrees or less exert high shearing force with respect to sand and soil in the soil discharging spaces (9A), therefore, the steering stability performance on a soft road is further improved.

It is preferred that the soil discharging spaces (9A) configured as such are not provided with a tie bar described later which is formed by raising a part of the groove bottom (8s) of the tread groove 8. Thereby, the volume of the sand mass can be secured, therefore, the shearing force on a soft road is maintained high.

The tread crossing grooves 9 include first grooves (9a) each inclined to one side with respect to the tyre axial direction, and second grooves (9b) each inclined in the opposite direction to the first grooves (9a), for example. Thereby, lateral force applied to the mass of sand in the first grooves (9a) and the second grooves (9b) is offset, therefore, stability performance during running is improved.

The first grooves (9a) and the second grooves (9b) in this embodiment are arranged alternately in a tyre circumferential direction. Thereby, the effects described above are exerted effectively.

The crown region (Cr) is provided with a plurality of crown blocks 11, each of the middle regions (M) is provided with a plurality of middle blocks 12, and each of the shoulder regions (S) is provided with a plurality of shoulder blocks 13. In each of the crown blocks 11, a centroid of a ground contacting surface thereof is located within the crown region (Cr). In each of the middle blocks 12, the centroid of the ground contacting surface thereof is located within a respective one of the middle regions (M). In each of the shoulder blocks 13, the centroid of the ground contacting surface thereof is located within a respective one of the shoulder regions (S). Note that in a case where a concave portion such as a groove and the like is provided on the ground contacting surface of each of the blocks 11 to 13, the centroid mentioned above means the centroid of a virtual ground contacting surface obtained by filling the concave portion.

Each of the middle blocks 12 and the shoulder blocks 13 is virtually divided into four block portions (b1) to (b4) by a line segment (n1) which divides a respective one of ground contacting surfaces (12a) and (13a) in the tyre axial direction into two equal parts and a line segment (n2) which divides a respective one of ground contacting surfaces (12a) and (13a) in the tyre circumferential direction into two equal parts. As shown in FIG. 2, in this specification, for the sake of convenience, in each of the blocks 12 and 13 arranged in the first middle region (M1) and the first shoulder region (S1), a block portion arranged on a side of the first tread edge (Te1) and on an upper side is the block portion (b1). Further, in each of the blocks 12 and 13 arranged in the second middle region (M2) and the second shoulder region (S2), a block portion arranged on a side of the second tread edge (Te2) and on the upper side is the block portion (b1). Hereinafter, in each of the blocks 12 and 13, a block portion arranged on a lower side of the block portion (b1) is the block portion (b2), a block portion arranged on a side of the tyre equator (C) of the block portion b2 is the block portion (b3), and a block portion arranged on the upper side of the block portion (b3) is the block portion (b4).

Figure 3:
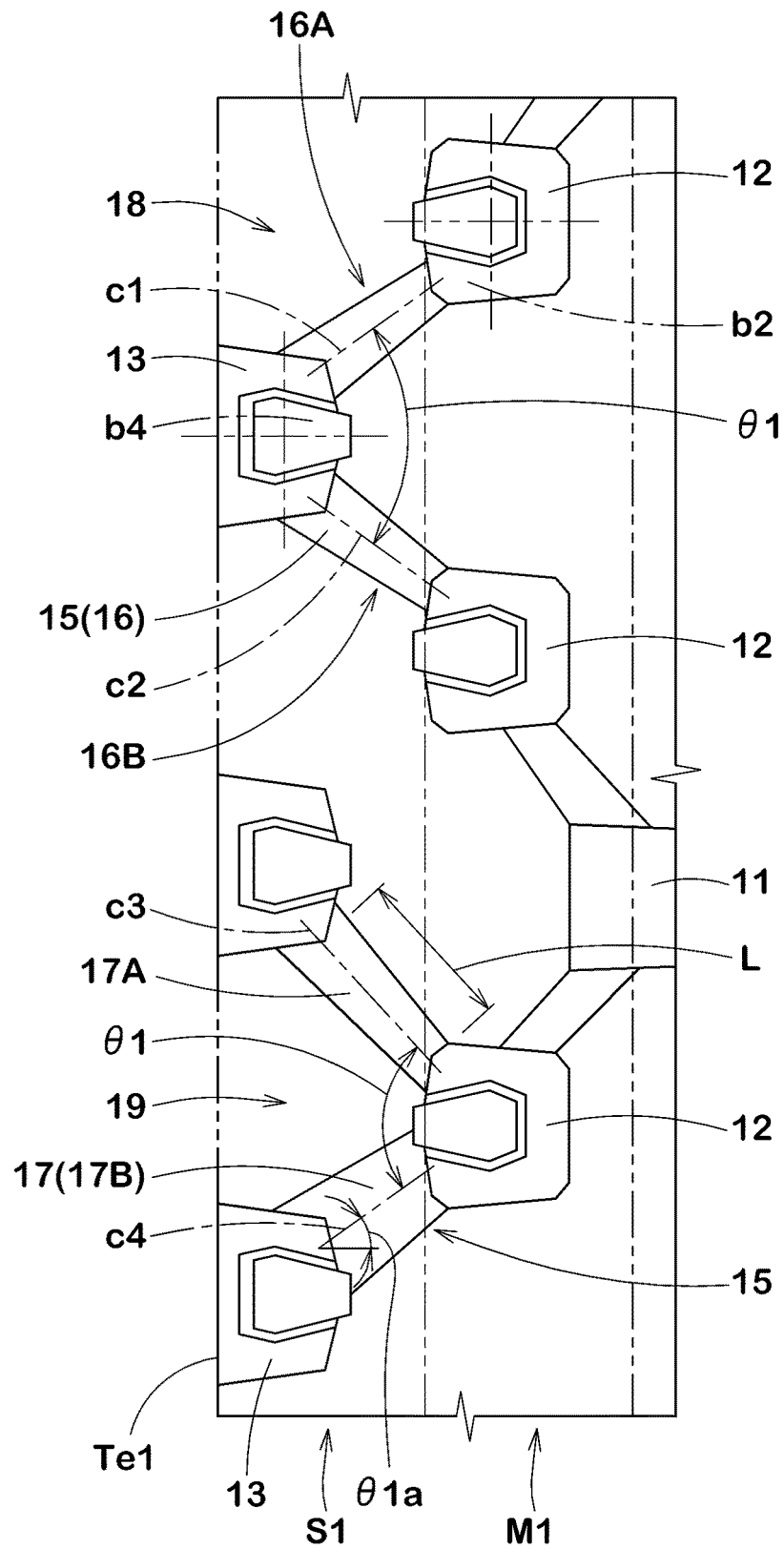
FIG. 3 is an enlarged view of a middle region and a shoulder region of FIG. 2.

FIG. 3 is an enlarged view of the first middle region (M1) and the first shoulder region (S1). As shown in FIG. 3, each of the middle blocks 12 in this embodiment is connected with its adjacent one of the shoulder blocks 13 by a shoulder tie bar 15. The shoulder tie bars 15 increase rigidity between the middle blocks 12 and the shoulder blocks 13. Thereby, the shearing force on a soft road is increased, therefore, excellent steering stability performance on a soft road is exerted. Further, each of the blocks 12 and 13 in which the rigidity is increased can increase ground contact pressure against a hard road, therefore, the steering stability performance on a hard road is improved. Note that the second middle region (M2) and the second shoulder region (S2) are configured in a similar way to the first middle region (M1) and the first shoulder region (S1), therefore, the description thereof is omitted.

The shoulder tie bars 15 in this embodiment include first shoulder tie bars 16 and second shoulder tie bars 17. A pair of the first shoulder tie bars 16 extend from one of the shoulder blocks 13 to be connected with different middle blocks 12. A pair of the second shoulder tie bars 17 extend from one of the middle blocks 12 to be connected with different shoulder blocks 13.

Each pair of the first shoulder tie bars 16 in this embodiment is connected with a respective one of the shoulder blocks 13 and the middle blocks 12 adjacent to the shoulder block 13 on both sides thereof in the tyre circumferential direction. Further, each pair of the second shoulder tie bars 17 in this embodiment is connected with a respective one of the middle blocks 12 and the shoulder blocks 13 adjacent to the middle block 12 on both sides thereof in the tyre circumferential direction. Thereby, each pair of the first shoulder tie bars 16 is shaped as a substantially v-shape convex outwardly in the tyre axial direction. Further, each pair of the second shoulder tie bars 17 is formed as a substantially v-shape convex inwardly in the tyre axial direction. The first shoulder tie bars 16 and the second shoulder tie bars 17 configured as such restrain movement of the middle blocks 12 and the shoulder blocks 13 in the tyre axial direction and the tyre circumferential direction, therefore, the shearing force with respect to a soft road is increased. Furthermore, the first shoulder tie bars 16 and the second shoulder tie bars 17 configured as such are helpful for increasing the ground contact pressure on a hard road.

The first shoulder tie bars 16 and the second shoulder tie bars 17 are arranged alternately in the tyre circumferential direction. That is, in this embodiment, first block groups 18 connected with the first shoulder tie bars 16 and second block groups 19 connected with the second shoulder tie bars 17 are arranged alternately in the tyre circumferential direction. Each of the first block groups 18 is formed by one shoulder block 13 and two middle blocks 12 connected by the first shoulder tie bars 16. Each of the second block groups 19 is formed by one middle block 12 and two shoulder blocks 13 connected by the second shoulder tie bars 17. More specifically, in this embodiment, one first block group 18 is formed by one shoulder block 13, two middle blocks 12 adjacent on both sides of the one shoulder block 13 in the tyre circumferential direction, and two first shoulder tie bars 16 each connecting the one shoulder block 13 with a respective one of the two middle blocks 12, and one second block group 19 is formed by one middle block 12, two shoulder blocks 13 adjacent on both sides of the one middle block in the tyre circumferential direction, and two second shoulder tie bars 17 each connecting the one middle block 12 with a respective one of the two shoulder blocks 13. Thereby, it is possible that rigidity difference between the shoulder regions (S) and the middle regions (M) is decreased, therefore, stability during cornering on a soft road and a hard road is further improved.

Each pair of the first shoulder tie bars 16 is formed by a first portion 16A connected with one of the middle blocks 12 on one side and a second portion 16B connected with one of the middle blocks 12 on the other side. The first portion 16A and the second portion 16B are connected with the shoulder block 13 such that the first portion 16A and the second portion 16B are separated from each other without intersecting with each other. Each pair of the second shoulder tie bars 17 is also formed by a first portion 17A connected with one of the shoulder blocks 13 on one side and a second portion 17B connected with one of the shoulder blocks 13 on the other side. The first portion 17A and the second portion 17B are connected with the middle block 12 such that the first portion 17A and the second portion 17B are separated from each other without intersecting with each other. Thereby, the load from each of the first portions 16A and 17A and the second portions 16B and 17B is distributed to the middle blocks 12 or the shoulder blocks 13, therefore, decrease in the rigidity of the blocks is suppressed.

It is preferred that an angle ($\theta 1$) formed by the shoulder tie bars 15 configured as such is less than 90 degrees. Thereby, deformation, due to running, of the middle blocks 12 and the shoulder blocks 13 which come into contact with the ground mainly during cornering is suppressed, therefore, grip on a hard road during cornering is increased. The angle ($\theta 1$) of the first shoulder tie bars 16 is an angle sandwiched by a groove center line (c1) of the first portion 16A and a groove center line (c2) of the second portion 16B in a plan view of the tread portion 2. The angle ($\theta 1$) of the second shoulder tie bars 17 is an angle sandwiched by a groove center line (c3) of the first portion 17A and a groove center line (c4) of the second portion 17B.

In order to effectively exert the effects described above, it is preferred that an angle ($\theta 1a$) of each of the first portions 17A and second portions 17B of the first shoulder tie bars 16 and the first portions 17A and the second portions 17B of the second shoulder tie bars 17 with respect to the tyre axial direction is 30 degrees or more and 60 degrees or less.

Each of the shoulder tie bars 15 in this embodiment is connected with the block portions such that a distance (L) between the shoulder block 13 and the middle block 12 with which the shoulder tie bar 15 is connected becomes minimum. Thereby, groove volume of the tread groove 8 is secured large, therefore, large shearing force on a soft road is maintained. In each of the first block groups 18 in this embodiment, the first portion 16A of the first shoulder tie bars 16 is connected with the block portion (b2) of the middle block 12 and the block portion (b4) of the shoulder block 13, for example.

Figure 4:
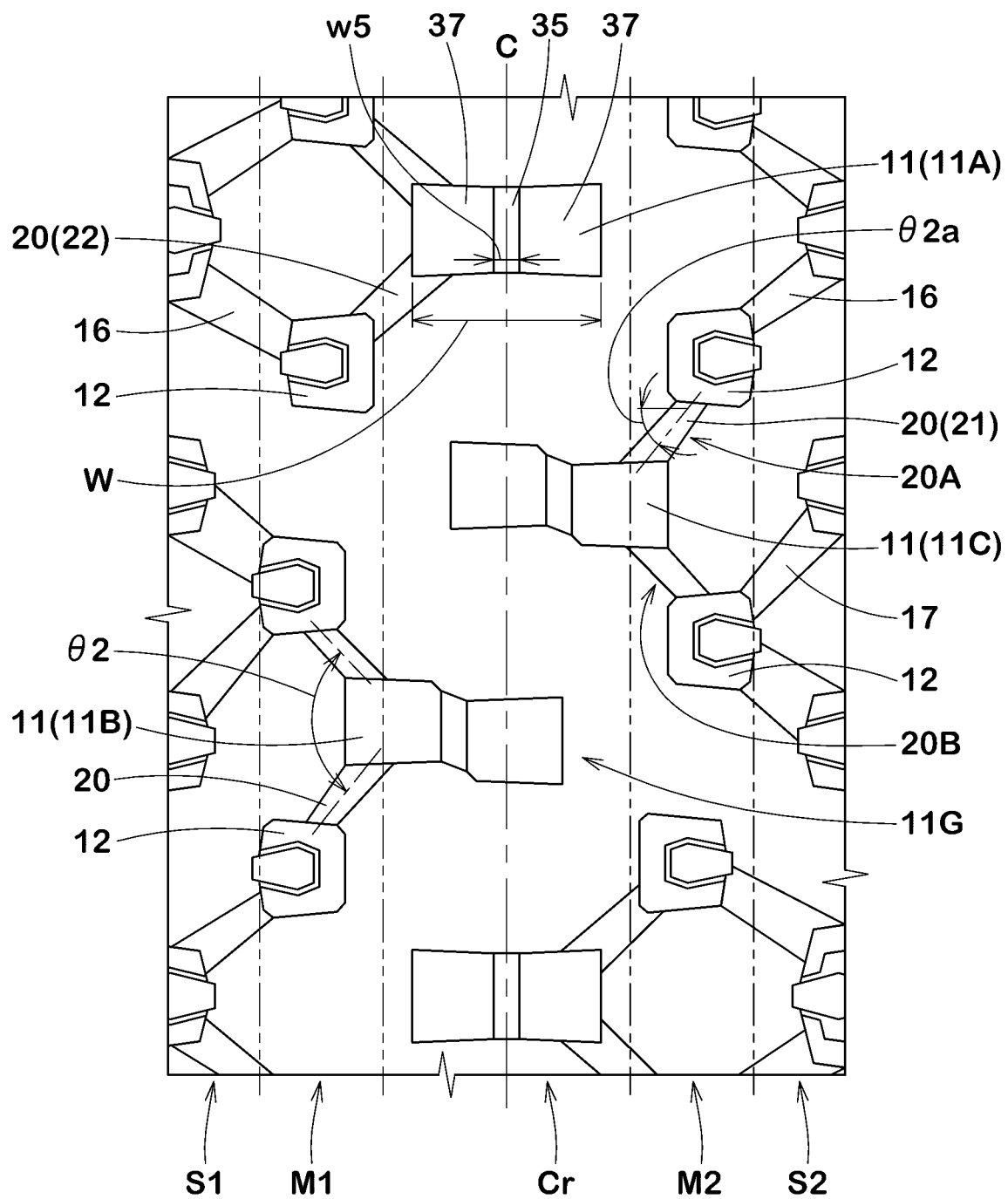
FIG. 4 is an enlarged view of a crown region of FIG. 2.

FIG. 4 is an enlarged view of the middle regions (M) and the crown region (Cr). As shown in FIG. 4, each of the middle blocks 12 is connected with one of the crown blocks 11 by a crown tie bar 20. The crown tie bars 20 increase the rigidity of the middle blocks 12 and the crown blocks 11, therefore, the ground contact pressure on a hard road is increased while the shearing force on a soft road is increased.

In this embodiment, a pair of the crown tie bars 20 extend from each of the crown blocks 11 to be connected with two different ones of the middle blocks 12. Each pair of the crown tie bars 20 connects a respective one of the crown blocks 11 and two middle blocks 12 adjacent to the crown block 11 on both sides thereof in the tyre circumferential direction. Thereby, each pair of the crown tie bars 20 is formed as a substantially v-shape convex inwardly in the tyre axial direction.

The crown tie bars 20 include first crown tie bars 21 and second crown tie bars 22. In this embodiment, a pair of the crown tie bars 20 extends from each of the crown blocks 11. A pair of the first crown tie bars 21 includes the crown tie bar 21 extending so as to be connected with one of the middle blocks 12 connected with one of the first shoulder tie bars 16 and the crown tie bar 21 extending so as to be connected with one of the middle blocks 12 connected with one of the second shoulder tie bars 17 adjacent to the first shoulder tie bar 16 in the tyre circumferential direction. In this embodiment, a pair of the second crown tie bars 22 extends so as to be connected with two middle blocks 12 each connected with a respective one of the first shoulder tie bars 16. The second crown tie bars 22 in this embodiment are arranged on both sides in the tyre circumferential direction of each pair of the first crown tie bars 21 adjacent to each other in the tyre circumferential direction.

Each pair of the crown tie bars 20 in this embodiment includes a first crown portion 20A connected with one of the middle blocks 12 on one side and a second crown portion 20B connected with one of the middle blocks 12 on the other side. The first crown portion 20A and the second crown portion 20B in this embodiment are connected with the crown block 11 such that the first crown portion 20A and the second crown portion 20B are separated from each other without intersecting with each other. Note that the crown tie bars 20 are not limited to such an embodiment, but they may be formed only by the first crown portions 20A each connecting one crown block 11 with one middle block 12, for example.

It is preferred that an angle (θ2) formed by each pair of the crown tie bars 20 is larger than the angle (θ1) of the shoulder tie bars 15. Thereby, the crown tie bars 20 have large tyre circumferential components, therefore, movement in the tyre circumferential direction of the crown blocks 11 to which large ground contact pressure is applied is effectively suppressed, thereby, the grip on a hard road is increased. From such a point of view, it is preferred that the angle (θ2) of the crown tie bars 20 is 80 degrees or more and 110 degrees or less, for example.

In order to further exert the effects described above, it is preferred that an angle (θ2a) of each of the first crown portions 20A and the second crown portions 20B with respect to the tyre axial direction is 35 degrees or more and 65 degrees or less.

In this embodiment, all the middle blocks 12 and all the shoulder blocks 13 are connected by the shoulder tie bars 15, and all the crown blocks 11 and all the middle blocks 12 are connected by the crown tie bars 20. Note that the present invention is not limited to such an embodiment.

As shown in FIG. 2, it is preferred that a width (w3) perpendicular to a longitudinal direction of each of the crown tie bars 20 is smaller than a width (w2) perpendicular to a longitudinal direction of each of the shoulder tie bars 15. Thereby, it is possible that deformation of the shoulder blocks to which large lateral force is applied is effectively suppressed, therefore, it is possible that the steering stability performance is further improved.

As shown in FIG. 1, it is preferred that a height (h1) of each of the crown tie bars 20 and a height (h1) of each of the shoulder tie bars 15 in this embodiment are 10% or more and 40% or less of a maximum block height (Hm) of the crown blocks 11, the middle blocks 12, and the shoulder blocks 13. Thereby, the groove volume of the tread groove 8 is secured while the rigidity of each of the blocks 11 to 13 is increased, therefore, the grip on a hard road and the traction on a muddy road are improved.

Figure 5:
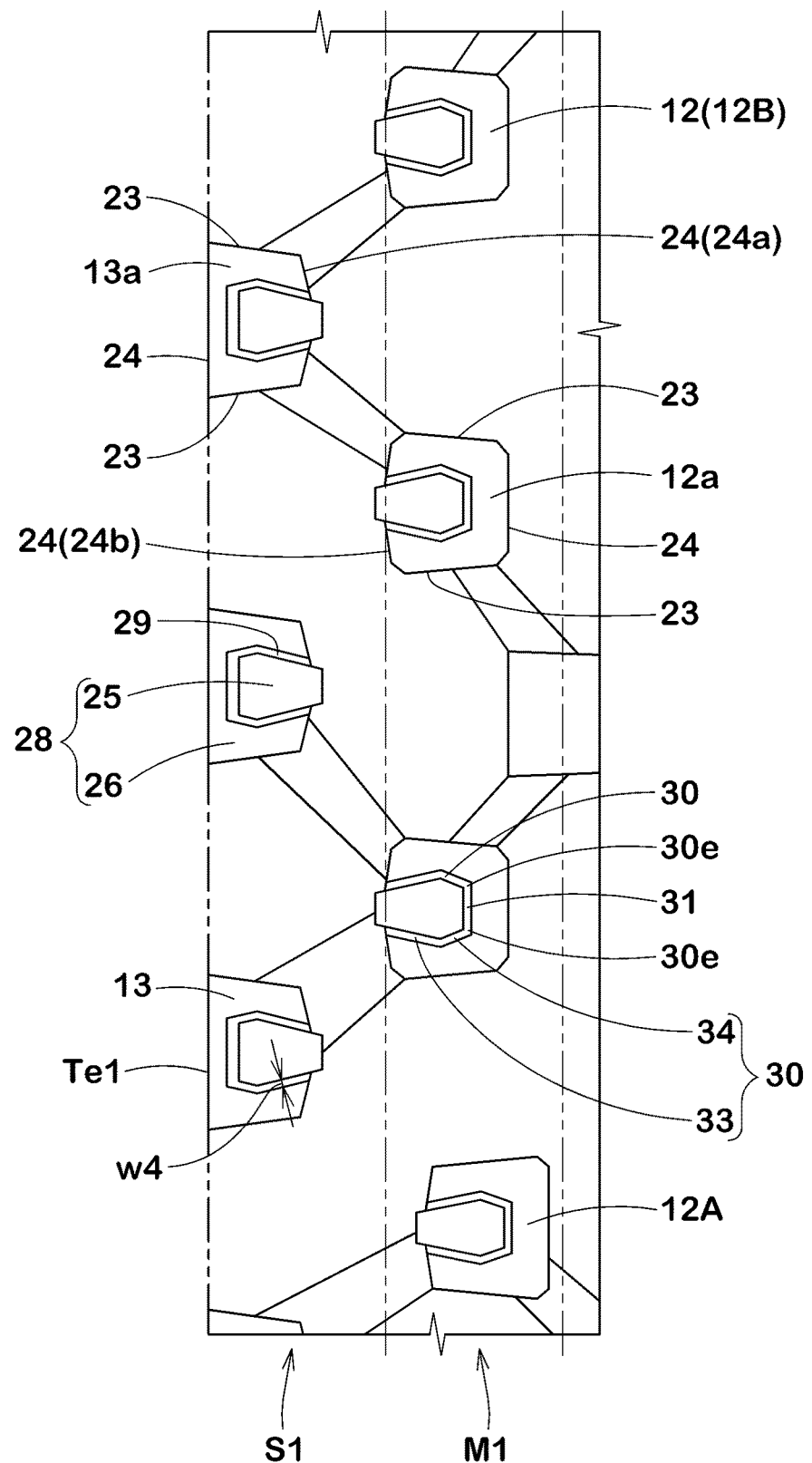
FIG. 5 is an enlarged view of the middle region and the shoulder region of FIG. 2.

FIG. 5 is an enlarged view of the first middle region (M1) and the first shoulder region (S1). As shown in FIG. 5, the ground contacting surface (12a) of each of the middle blocks and the ground contacting surface (13a) of each of the shoulder blocks 13 are each formed in a rectangular shape including a pair of axial edges 23 and a pair of circumferential edges 24 connecting between the pair of the axial edges 23 at both ends thereof, for example. The axial edges 23 are arranged on both sides in the tyre circumferential direction of each of the blocks 12 and 13 and extend in the tyre axial direction. The circumferential edges 24 are arranged on both sides in the tyre axial direction of each of the blocks 12 and 13 and extend in the tyre circumferential direction. The axial edges 23 and the circumferential edges 24 configured as such increase scratching force on a road surface during cornering, therefore, the steering stability performance is improved. Note that the ground contacting surfaces (12a) and (13a) of the middle blocks and the shoulder blocks 13 are not limited to such a configuration. The blocks 12 and 13 of the second middle region (M2) and the second shoulder region (S2) are also formed in the same manner as the blocks 12 and 13 of the first middle region (M1) and the first shoulder region (S1).

At least one of the middle blocks 12 and the shoulder blocks 13 (each of the middle blocks 12 and the shoulder blocks in this embodiment) includes a stepped ground contacting surface 28 including a first top surface 25 and a second top surface 26 having a smaller block height than the first top surface 25. The stepped ground contacting surface 28 is formed on all the middle blocks 12 and all the shoulder blocks 13 in this embodiment.

The stepped ground contacting surface 28 in this embodiment is provided with a groove 29 between the first top surface 25 and the second top surface 26. The grooves 29 configured as such increase edge components of the middle blocks and the shoulder blocks 13, therefore, frictional force against a road surface is maintained high.

Each of the grooves 29 in this embodiment includes a pair of axial portions 30 extending in the tyre axial direction and a circumferential portion 31 extending in the tyre circumferential direction so as to connect between the axial portions 30. The axial portions 30 in this embodiment are spaced apart from each other in the tyre circumferential direction.

Each of the pair of the axial portions 30 in this embodiment includes a first inclined portion 33 inclined to one side with respect to the tyre axial direction and a second inclined portion 34 inclined to an opposite side to the first inclined portion 33 with respect to the tyre axial direction. Each of the axial portions 30 is formed by the first inclined portion 33 and the second inclined portion 34 so as to be bent in a convex manner toward outside of a respective one of the blocks 12 and 13.

In each of the blocks 12 and 13, each of the axial portions 30 extends from the circumferential edge 24 on one side toward the circumferential edge 24 on the other side to have a terminating end (30e) terminating within the ground contacting surface without reaching the circumferential edge 24 on the other side. The circumferential portion 31 in this embodiment extends so as to connect between both terminating ends (30e). The first top surface 25 in this embodiment is formed in a hexagonal shape surrounded by the pair of the axial portions 30 and the circumferential portion 31. The second top surface 26 in this embodiment is formed in a substantially u-shape in a plan view so as to surround the first top surface 25 and the groove 29. In the first top surfaces 25 configured as such, since each of the axial portions 30 is bent, excessive movement and deformation in the tyre axial direction are suppressed, therefore, the first top surfaces 25 suitably contact with a hard road surface, thereby, the steering stability performance is improved.

More specifically, the axial portions 30 of each of the shoulder blocks 13 extend axially outwardly from a circumferential edge (24a) arranged on a side of the tyre equator (C). The axial portions 30 of each of the middle blocks 12 extend from a circumferential edge (24b) arranged on an outer side in the tyre axial direction toward the tyre equator (C).

It is preferred that a groove width (w4) of each of the grooves 29 configured as such is about 0.5 mm or more and about 3 mm or less, for example. Further, it is preferred that a depth (h3) (shown in FIG. 1) of each of the grooves 29 is 0.5 mm or more and 5 mm or less.

Figure 6A:
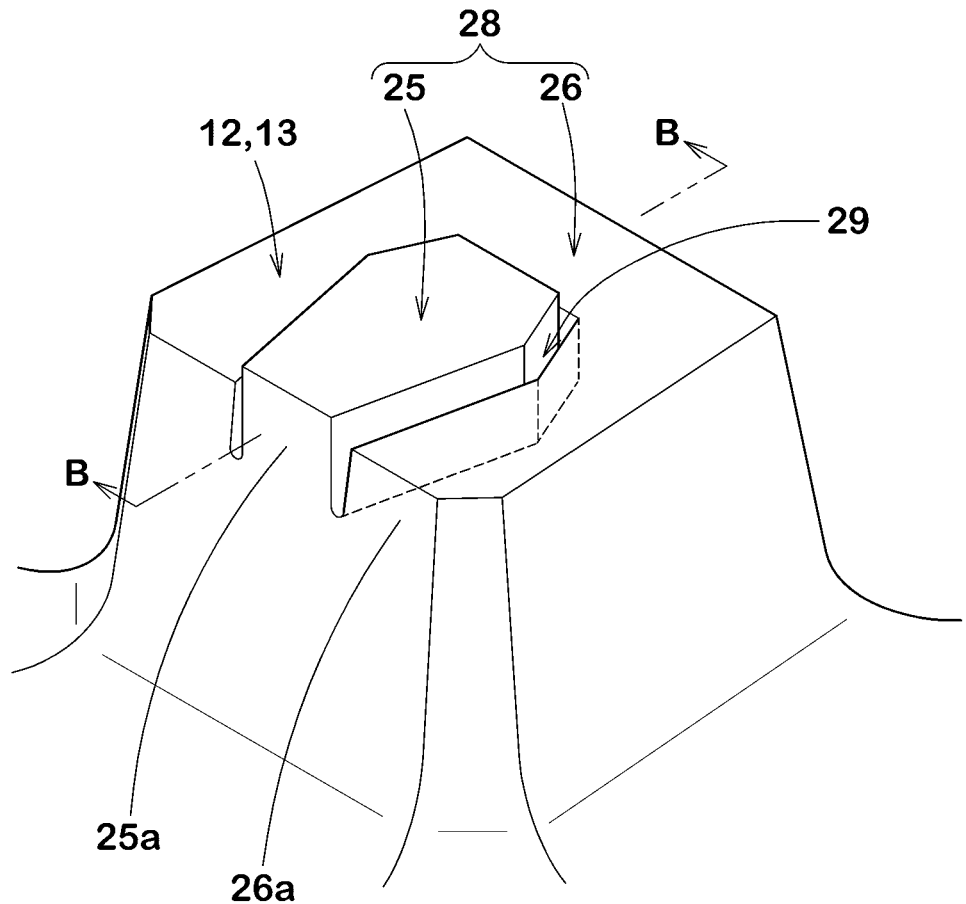
FIG. 6A is a perspective view of one of middle blocks of FIG. 3.
Figure 6B:
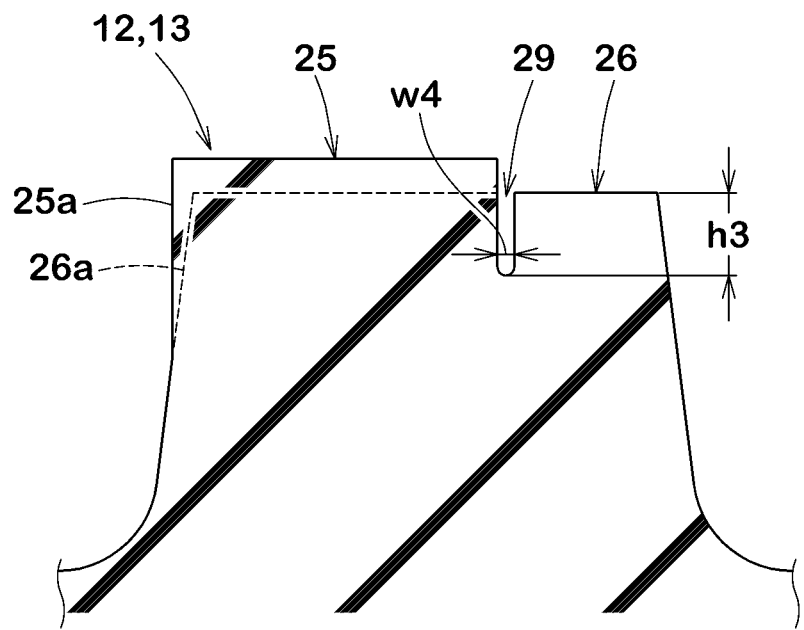
FIG. 6B is a cross-sectional view taken along B-B line of FIG. 6A.

FIG. 6A is a perspective view of one of the middle blocks 12. FIG. 6B is a cross-sectional view taken along B-B line of FIG. 6A. As shown in FIGS. 6A and 6B, each of the middle blocks 12 has a first block wall (25a) extending radially inwardly from the first top surface 25 and a second block wall (26a) extending radially inwardly from the second top surface 26, and the first block wall (25a) is positioned on an outer side of the middle block 12 than the second block wall (26a). The first block walls (25a) and the second block walls (26a) configured as such increase the shearing force with respect to a muddy road. Note that the first block walls (25a) and the second block walls (26a) configured as such may be provided in the shoulder blocks 13.

As shown in FIG. 5, the middle blocks 12 in this embodiment include first middle blocks 12A arranged on a side of the tyre equator (C) and second middle blocks 12B arranged on the outer side in the tyre axial direction of the first middle blocks 12A. In the first middle region (M1) in this embodiment, the first middle blocks 12A and the second middle blocks 12B are arranged such that they overlap when viewed in the tyre circumferential direction. Thereby, the behavior of a vehicle body due to a change in leaning of the vehicle body during cornering is stabilized.

As shown in FIG. 4, the crown blocks 11 in this embodiment include first crown blocks 114, second crown blocks 11B, and third crown blocks 11C. The first crown blocks 11A are arranged within the crown region (Cr). Each of the second crown blocks 11B is arranged across the crown region (Cr) and the first middle region (M1). Each of the third crown blocks 11c is arranged across the crown region (Cr) and the second middle region (M2). Thereby, in the crown region (Cr) and the middle regions (M) in this embodiment, over the entire length in the tyre axial direction, any one of the crown blocks 11A to 11C or any one of the middle blocks 12A and 12B is arranged on a tyre circumferential direction line. In other words, when viewed in the tyre circumferential direction, at least one of the crown blocks 11A to 11c or at least one of the middle blocks 12A and 12B is arranged on the tyre circumferential direction line at any point in the tyre axial direction over the entire length in the tyre axial direction. Further in other words, the crown region (Cr) and the middle regions (M1) and (M2) have no blind portion which extends along the entire tyre circumferential line over the entire tyre circumferential direction and has no blocks provided therein. Therefore, the behavior of the change in the leaning of the vehicle body from straightaway driving to cornering is stabilized, thereby, the steering stability performance is improved.

In this embodiment, one first crown block 11A, one second crown block 11B, and one third crown block 11c form one crown block group 11G, and the crown blocks 11G are arranged in the tyre circumferential direction. Thereby, the effects described above are effectively exerted.

Each of the crown blocks 11 is provided in a center portion thereof with a shallow bottom groove 35, therefore, it is divided into two block pieces 37. The shallow bottom grooves 35 configured as such increase the edge components in the tyre circumferential direction of the crown blocks 11. It is preferred that a width (w5) of each of the shallow bottom grooves 35 is 5% or more and 25% or less of a width (w) of each of the crown blocks 11, and it is preferred that a depth (h4) (shown in FIG. 1) of each of the shallow bottom grooves 35 is 5% or more and 50% or less of the block height (H) of each of the crown blocks 11, for example.

Each of the first crown blocks 11A is formed as a non-shift block in which two block pieces 37 are not displaced in the tyre circumferential direction. Each of the second crown blocks 11B and the third crown blocks 11c is formed as a shift block in which two block pieces 37 are displaced in the tyre circumferential direction.

While detailed description has been made of the tyre as an embodiment of the present invention, it is needless to say that the present invention can be embodied in various forms without being limited to the illustrated embodiment.

Working Examples (Examples)

Pneumatic tyres for a motorcycle having the basic structure shown in FIG. 1 and the basic pattern shown in FIG. 2 were made by way of test according to the specifications listed in Table 1, then each of the test tyres was tested for the steering stability performance on a soft road and a hard road. Common specifications of the test tyres and the test methods were as follows.

<Steering Stability Performance on Soft Road and Hard Road>

Each of the test tyres were mounted on a test vehicle described below and a test rider drove the test vehicle on a dry asphalt road surface and a muddy road surface of a test course. While the test rider drove the test vehicle, the steering stability performance related to the grip and the stability was evaluated by the test rider's feeling. The results are indicated by a point on a scale of 1 to 10 based on Reference 1 being 5 points, wherein the larger numerical value is better.

Tyre: 80/100-21 (front), 120/80-19 (rear)
Tyre rim: WM1.60 (front), WM2.15 (rear)
Tyre inner pressure: 80 kPa
Test vehicle: motorcycle for motocross competition with a displacement of 450 cc.

The test results and the like are shown in Table 1.

TABLE 1

|  | Ref. 1 | Ref. 2 | Ref. 3 | Ex. 1 | Ex. 2 | Ex. 3 | Ex. 4 | Ex. 5 | Ex. 6 |
|---|---|---|---|---|---|---|---|---|---|
| Width (w1) of Soil discharging space [mm] | 5 | 10 | 10 | 10 | 10 | 10 | 10 | 10 | 10 |
| Angle (α1) of Soil discharging space [degree] | 40 | 25 | 55 | 40 | 40 | 40 | 40 | 40 | 40 |
| Presence (P) or Absence (A) of First shoulder tie bar | P | P | P | P | A | P | P | P | P |
| Presence (P) or Absence (A) of Second shoulder tie bar | P | P | P | P | P | A | P | P | P |
| Presence (P) or Absence (A) of Blind portion in Crown region and Middle regions | A | A | A | A | A | A | P | A | A |
| Presence (P) or Absence (A) of Crown block group | P | P | P | P | P | P | P | A | P |
| Presence (P) or Absence (A) of Stepped ground contacting surface | P | P | P | P | P | P | P | P | A |
| Steering stability performance on Soft road [scale of 1 to 10] | 5 | 5 | 5 | 8 | 7 | 6.5 | 7 | 7 | 6.5 |
| Steering stability performance on Hard road [scale of 1 to 10] | 5 | 5 | 5 | 7 | 6.5 | 7 | 6.5 | 6.5 | 7 |

From the test results, it was confirmed that the tyres in the Examples in Table 1 exerted high steering stability performance compared with the tyres in the References in Table 1.

The invention claimed is:

1. A tyre for running on rough terrain comprising a tread portion, wherein
the tread portion includes a first tread edge, a second tread edge, a shoulder region, a crown region, and a middle region,
the shoulder region extends inwardly in the tyre axial direction from the first tread edge and has a development width of one sixth of a tread development width,
the middle region is arranged on an inner side in the tyre axial direction of the shoulder region and has a development width of one sixth of the tread development width,
the crown region is arranged on an inner side in the tyre axial direction of the middle region and has a development width of one third of the tread development width,
the tread portion comprises a plurality of blocks and tread crossing grooves extending between the first tread edge and the second tread edge without intersecting the plurality of the blocks,
the plurality of the blocks includes a plurality of shoulder blocks arranged in the shoulder region, a plurality of crown blocks arranged in the crown region, and a plurality of middle blocks arranged in the middle region, wherein the total number of blocks in each of the shoulder, crown, and middle regions is the same,
in a development view of the tread portion, each of the tread crossing grooves includes a soil discharging space having a width of at least 10 mm or more and extending linearly so as to connect between the first tread edge and the second tread edge,
the soil discharging space is inclined at an angle of 30 degrees or more and 50 degrees or less with respect to a tyre axial direction,
the tread crossing grooves include first grooves each inclined to one side with respect to the tyre axial direction, and second grooves each inclined in an opposite direction to the first grooves, such that circumferentially adjacent first and second grooves extend toward each other to form a narrow portion on one tread edge and away from each other to form a wide portion on an opposite tread edge,
the tread portion includes a first region defined by circumferentially adjacent first and second grooves to include the crown region as well as the middle region and shoulder region that are adjacent to the narrow portion formed by the first and second grooves,
in the first region, the total number of middle blocks is greater than the total number of shoulder blocks,
in the first region, the total number of crown blocks is greater than the total number of middle blocks,
the shoulder blocks are connected with middle blocks by shoulder tie bars,
the shoulder tie bars include first shoulder tie bars and second shoulder tie bars,
two first shoulder tie bars extend from one shoulder block to be connected with different middle blocks, and
two second shoulder tie bars extend from one middle block to be connected with different shoulder blocks.

2. The tyre for running on rough terrain according to claim 1, wherein the first grooves and the second grooves are arranged alternately in a tyre circumferential direction.

3. The tyre for running on rough terrain according to claim 1, wherein the first shoulder tie bars and the second shoulder tie bars are arranged alternately in a tyre circumferential direction.

4. The tyre for running on rough terrain according to claim 1, wherein an angle formed between the two first shoulder tie bars is less than 90 degrees.

5. The tyre for running on rough terrain according to claim 1, wherein at least one of the middle blocks and the shoulder blocks includes a stepped ground contacting surface including a first top surface and a second top surface having a smaller block height than the first top surface.

6. The tyre for running on rough terrain according to claim 1, wherein
the tread portion includes another middle region arranged on a side of the second tread edge of the crown region and having a development width of one sixth of the tread development width,
the crown blocks include first crown blocks, second crown blocks, and third crown blocks,
the first crown blocks are arranged within the crown region,
each of the second crown blocks is arranged across the crown region and the middle region on a side of the first tread edge,
each of the third crown blocks is arranged across the crown region and the middle region on a side of the second tread edge,
one first crown block, one second crown block, and one third crown block form a crown block group, and
the crown block groups are arranged in a tyre circumferential direction.

7. The tyre for running on rough terrain according to claim 1, wherein
a centroid of a ground contacting surface of each of the crown blocks is located within the crown region,
the centroid of the ground contacting surface of each of the middle blocks is located within the middle region, and
the centroid of the ground contacting surface of each of the shoulder blocks is located within the shoulder region.

8. The tyre for running on rough terrain according to claim 1, wherein
two first shoulder tie bars extend from one shoulder block to be connected with two middle blocks adjacent to the shoulder block on both sides thereof in a tyre circumferential direction such that the two first shoulder tie bars are shaped as a substantially V-shape convex outwardly in the tyre axial direction, and
two second shoulder tie bars extend from one middle block to be connected with two shoulder blocks adjacent to the middle block on both sides thereof in the tyre circumferential direction such that the two second shoulder tie bars are shaped as a substantially V-shape convex inwardly in the tyre axial direction.

9. The tyre for running on rough terrain according to claim 1, wherein
the two first shoulder tie bars are formed by a first portion connected with the middle block on one side in the tyre circumferential direction and a second portion connected with the middle block on the other side,
the first portion and the second portion of the first shoulder tie bars are connected with the shoulder block such that the first portion and the second portion of the first shoulder tie bars are separated without intersecting with each other,
the two second shoulder tie bars are formed by a first portion connected with the shoulder block on one side in the tyre circumferential direction and a second portion connected with the shoulder block on the other side, and
the first portion and the second portion of the second shoulder tie bars are connected with the middle block such that the first portion and the second portion of the second shoulder tie bars are separated without intersecting with each other.

10. The tyre for running on rough terrain according to claim 9, wherein an angle of each of the first portion and second portion of the first shoulder tie bars and the first portion and the second portion of the second shoulder tie bars with respect to the tyre axial direction is 30 degrees or more and 60 degrees or less.

11. The tyre for running on rough terrain according to claim 5, wherein the stepped ground contacting surface is provided with a groove between the first top surface and the second top surface.

12. The tyre for running on rough terrain according to claim 11, wherein the groove includes a pair of axial portions extending in the tyre axial direction and spaced apart from each other in a tyre circumferential direction and a circumferential portion extending in the tyre circumferential direction so as to connect between the axial portions.

13. The tyre for running on rough terrain according to claim 12, wherein each of the axial portions includes a first inclined portion inclined to one side with respect to the tyre axial direction and a second inclined portion inclined to an opposite side to the first inclined portion with respect to the tyre axial direction such that each of the axial portions is bent in a convex manner toward outside of the block.

14. The tyre for running on rough terrain according to claim 12, wherein
each of the axial portions extends from a circumferential edge on one side of the block toward a circumferential edge on the other side of the block to have a terminating end terminating within the block without reaching the circumferential edge on the other side, and
the circumferential portion extends so as to connect between both terminating ends.

15. The tyre for running on rough terrain according to claim 5, wherein
the block has a first block wall extending inwardly in a tyre radial direction from the first top surface and a second block wall extending inwardly in the tyre radial direction from the second top surface, and
the first block wall is positioned on an outer side of the block than the second block wall.

16. The tyre for running on rough terrain according to claim 1, wherein
none of the middle blocks connected to the shoulder blocks via the first shoulder tie bars are connected to other shoulder blocks which are connected to the second shoulder tie bars, by tie bars; and
none of the shoulder blocks connected to the middle block via the second shoulder tie bars are connected to other middle blocks, which are connected to the first shoulder tie bars, by tie bars.

17. The tyre for running on rough terrain according to claim 16, wherein the soil discharging space is not provided with any tie bars.

* * * * *